(12) United States Patent
Frey et al.

(10) Patent No.: US 8,125,324 B2
(45) Date of Patent: Feb. 28, 2012

(54) CHARGE STATE INDICATOR FOR AN ELECTRIC VEHICLE

(75) Inventors: Paul DeWitt Frey, San Francisco, CA (US); Martin Forest Eberhard, San Carlos, CA (US); Scott Ira Kohn, Menlo Park, CA (US); Malcolm Sloan Smith, Palo Alto, CA (US); David Frederick Lyons, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/253,098

(22) Filed: Oct. 5, 2011

(65) Prior Publication Data

US 2012/0025765 A1  Feb. 2, 2012

Related U.S. Application Data

(63) Continuation of application No. 11/779,840, filed on Jul. 18, 2007, now Pat. No. 8,063,757.

(51) Int. Cl.
*B60Q 1/00* (2006.01)

(52) U.S. Cl. ............... 340/455; 340/636.1; 340/438

(58) Field of Classification Search ............... 340/425.5, 340/438, 455, 636, 693; 320/48; 429/91
See application file for complete search history.

(56) References Cited

U.S. PATENT DOCUMENTS

| | | | |
|---|---|---|---|
| 4,595,872 A | 6/1986 | Ball | |
| 5,202,617 A * | 4/1993 | Nor | 320/130 |
| 5,283,513 A * | 2/1994 | Fujita et al. | 320/138 |
| 5,521,443 A * | 5/1996 | Imura et al. | 307/10.2 |
| 5,596,261 A * | 1/1997 | Suyama | 320/152 |
| 5,656,919 A * | 8/1997 | Proctor et al. | 320/153 |
| 5,739,674 A | 4/1998 | Kawahara et al. | |
| 5,757,595 A * | 5/1998 | Ozawa et al. | 340/636.1 |
| 5,819,864 A | 10/1998 | Koike et al. | |
| 5,996,079 A | 11/1999 | Klein | |
| 6,238,076 B1 | 5/2001 | Pascale et al. | |
| 6,242,891 B1 | 6/2001 | Parsonage | |
| 6,357,887 B1 | 3/2002 | Novak | |
| 6,658,577 B2 | 12/2003 | Huppi et al. | |
| 6,762,583 B2 * | 7/2004 | Ho et al. | 320/107 |
| 6,784,640 B2 | 8/2004 | Mizuta et al. | |
| 6,888,322 B2 | 5/2005 | Dowling et al. | |
| 7,113,196 B2 | 9/2006 | Kerr | |
| 2001/0048287 A1 | 12/2001 | Vandelac | |
| 2006/0028174 A1 | 2/2006 | Hsiao | |

* cited by examiner

*Primary Examiner* — Brian Zimmerman
*Assistant Examiner* — James Yang
(74) *Attorney, Agent, or Firm* — Patent Law Office of David G. Beck

(57) ABSTRACT

One embodiment of the present subject matter includes a battery mounted to a vehicle, with a charge state circuit located in the electric vehicle and coupled to the battery, the charge state circuit configured to provide a charge state signal indicative of the charge state of the battery. The embodiment includes a charging coupler port located proximate to a user accessible exterior of the electrical vehicle and coupled to the battery, the charging coupler port to conduct charging energy to the battery and to provide a charger connection signal indicative of a connection to an external power source. The embodiment also includes a lighting circuit coupled to the charging coupler port and the charge state circuit to control the brightness and color of an illuminated indicator responsive to the charge state signal and the charger connection signal.

14 Claims, 6 Drawing Sheets

CHARGE STATE INDICATOR FOR AN ELECTRIC VEHICLE

CROSS-REFERENCE TO RELATED APPLICATION

This application is a continuation of U.S. patent application Ser. No. 11/779,840, filed 18 Jul. 2007, the disclosure of which is incorporated herein by reference for any and all purposes.

BACKGROUND OF THE INVENTION

Electric vehicles having batteries require periodic charging of the batteries. As such, some electric car applications provide users with chargers to charge vehicles. People who are provided with such chargers desire to know how to use them. Additionally, they desire to know how well the chargers are working. For instance, users desire to know when a charger has transmitted a sufficient charge to a battery such that it is appropriate to drive the electric vehicle.

SUMMARY OF THE INVENTION

The present invention provides a battery charging monitoring and status indication system, the system comprising a charging coupler port configured to conduct charging energy to the battery of an electric vehicle; a charging coupler port door that at least partially covers the charging port; a charging coupler port door switch configured to output a first door status signal when the charging coupler port door is open and to output a second door status signal when the charging coupler port door is closed; a battery charge state circuit that outputs various charge state signals depending upon whether a charging coupler is attached to the charging coupler port, whether energy is being transmitted through the charging coupler port, and the battery SOC; a fault detection circuit configured to output a fault signal when an electrical fault, such as a malfunctioning battery, is detected; and a lighting circuit configured to activate various colored status signals depending upon the output of the charging coupler port door switch, the output of the battery charge state circuit and the output of the fault detection system.

A further understanding of the nature and advantages of the present invention may be realized by reference to the remaining portions of the specification and the drawings.

DESCRIPTION OF THE SPECIFIC EMBODIMENTS

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
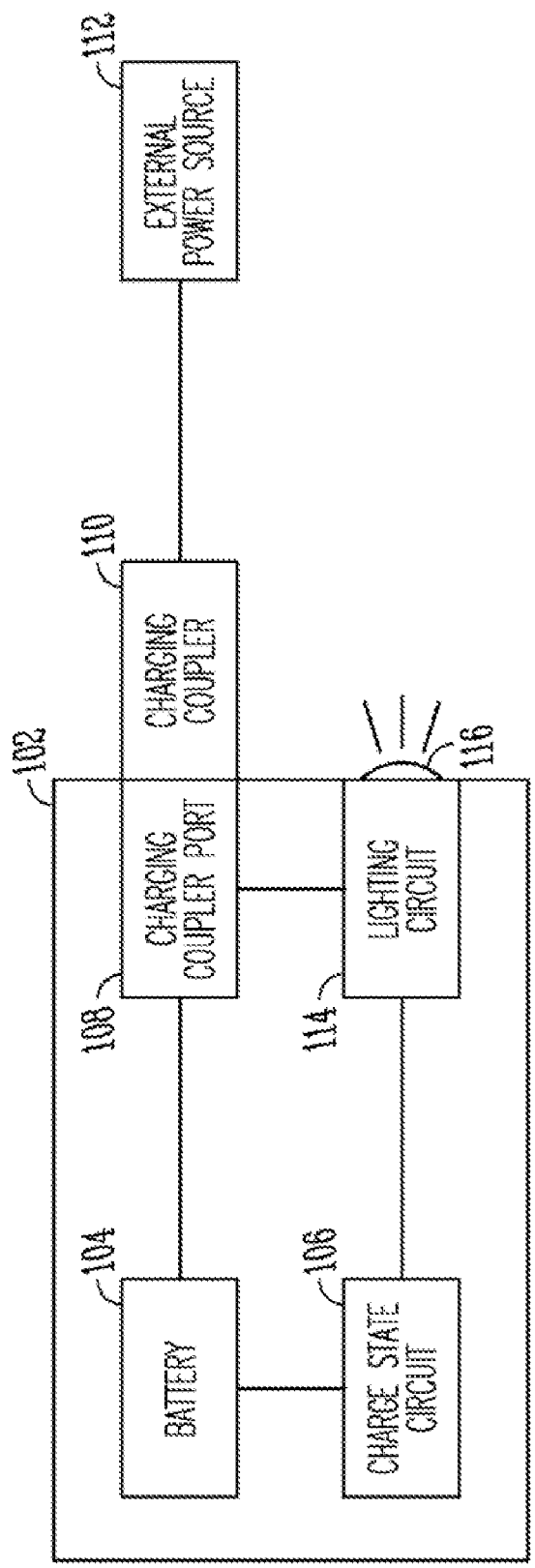
FIG. 1 is a high level diagram of an electric vehicle with a battery and a charging indicator, according to one embodiment of the present subject matter.

FIG. 1 is a high level diagram of an electric vehicle with a battery and a charging indicator, according to one embodiment of the present subject matter. An electric vehicle 102 is illustrated. Electric vehicles include, but are not limit to, ground based vehicles, aquatic vehicles, and aircraft. For the purposes of explanation, the present subject matter focuses on ground based vehicles. Plug-in hybrids and range extending vehicles are contemplated. Some embodiments of the present subject matter include a battery 104 mounted to the vehicle 102. Various batteries are contemplated. The present subject matter includes embodiments in which the battery 104 is a secondary battery that is rechargeable using electricity rather than chemicals or other materials. Various secondary battery chemistries are contemplated, including lithium ion battery chemistries, but the present subject matter should not be construed to be limited to lithium ion or any other battery chemistry.

Various embodiments include a charge state circuit 106 located in the electric vehicle 102 and coupled to the battery 104. In various embodiments, the charge state circuit 106 is configured to provide a charge state signal indicative of the charge state of the battery 104. A charge state circuit 106, in some embodiments, is a voltage meter. Other charge state circuits 106 are used in additional embodiments, including, but not limited to, current meters, coulomb counter, thermal meters, and other meters capable of monitoring how much energy is stored in a battery 104.

Various embodiments include a charging coupler port 108 located proximate to a user accessible exterior of the electrical vehicle 102 and coupled to the battery 104. In various embodiments, the charging coupler port 108 communicates charging energy to the battery 104. In some examples, this includes hardware to at least partially form a conductive path from the battery 102 to a conductive terminal of the charging coupler port 108. Some embodiments include one or more female terminals configured to receive a mating male terminal. Embodiments in which the charging coupler port 108 includes male terminals are contemplated. In some embodiments, the charging coupler port 108 is itself conductive and is in conductive communication with the battery 102. Inductive embodiments are contemplated, in which a field is used to communicate energy.

In some embodiments, a male terminal is part of a charging coupler 110. In various embodiments, a charging coupler 110 is a handheld connector mateable to the charging coupler port 108. Some embodiments include a charging coupler 110 which is conductive and which mates to one or more terminals of the charging coupler port 108. Various embodiments, however, include additional structure so that a user can handle the charging coupler 110 without being exposed to harmful shock.

In various embodiments, the charging coupler port 108 provides a charger connection signal indicative of a connection to an external power source 112. The external power source is a charging station which is connected to a municipal power grid in some embodiments, but the present subject matter is not so limited. Batteries, generators, and other power sources comprise the external power source 112 in various embodiments.

Various embodiments, include a lighting circuit 114 coupled to the charging coupler port 108 and the charge state circuit 106 to control the brightness and color of an illuminated indicator 116 responsive to the charge state signal and the charger connection signal. The illuminated indicator 116 is a computer monitor in some embodiments. In additional embodiments, the illuminated indicator 116 includes at least one multi-color lamp. In some embodiments, the illuminated indicator includes at least one multi-color LED. Various embodiments include a plurality of lamps. Some embodiments include a plurality of single color LEDs. Some embodiments include a mixture of multi-color LEDs and single-color LEDs. In various embodiments, the illuminated indicator 116 includes a white LED and the at least one lighting circuit is configured to illuminate the illuminated indicator to a white color by illuminating the white LED.

Figure 2:
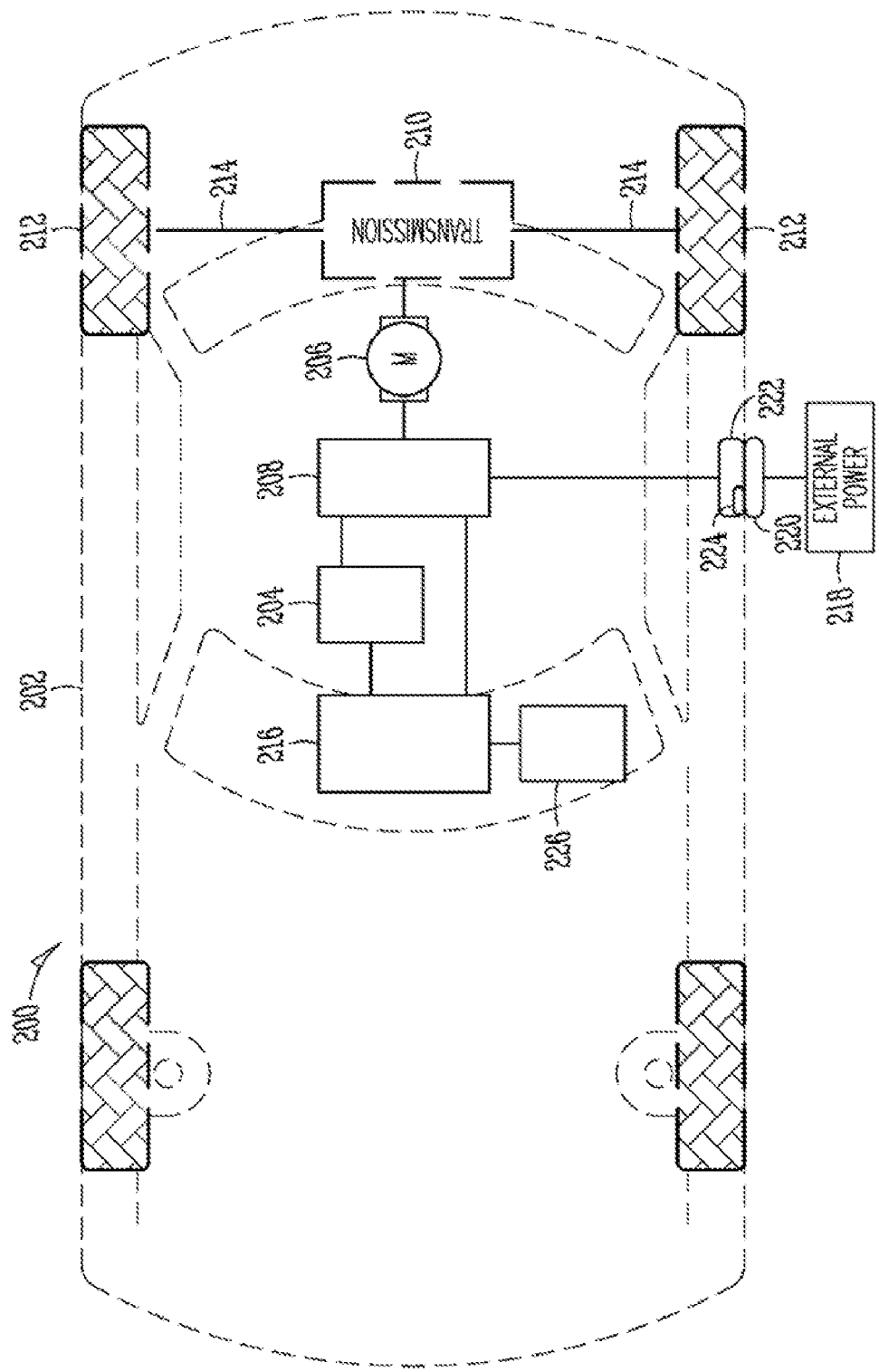
FIG. 2 shows a vehicle system, according to one embodiment of the present subject matter.

FIG. 2 shows a vehicle system 200, according to one embodiment of the present subject matter. In various embodiments, the vehicle 202 is an electric vehicle and includes a vehicle propulsion battery 204 and at least one propulsion motor 206 for converting battery energy into mechanical motion, such as rotary motion. The present subject matter includes examples in which the vehicle propulsion battery 204 is a subcomponent of an energy storage system ("ESS"). An ESS includes various components associated with transmitting energy to and from the vehicle propulsion battery 204 in various examples, including safety components, cooling components, heating components, rectifiers, etc. The inventors have contemplated several examples of ESSs and the present subject matter should not be construed to be limited to the configurations disclosed herein, as other configurations of a vehicle propulsion battery 204 and ancillary components are possible.

The battery includes one or more lithium ion cells in various examples. In some examples, the battery 204 includes a plurality of lithium ion cells coupled in parallel and/or series. Some examples include cylindrical lithium ion cells. In some examples, the battery 204 includes one or more cells compatible with the 18650 battery standard, but the present subject matter is not so limited. Some examples include a first plurality of cells connected in parallel to define a first brick of cells, with a second plurality of cells connected in parallel to define a second brick of cells, with the first brick and the second brick connected in series. Some embodiment connect 69 cells in parallel to define a brick. Battery voltage, and as such, brick voltage, often ranges from around 3.6 volts to about 4.2 volts in use. In part because the voltage of batteries ranges from cell to cell, some embodiments include voltage management systems to maintain a steady voltage. Some embodiments connect 9 bricks in series to define a sheet. Such a sheet has around 35 volts. Some embodiment connect 11 sheets in series to define the battery of the ESS. The ESS will demonstrate around 385 volts in various embodiments. As such, some examples include approximately 6,831 cells which are interconnected.

Additionally illustrated is a energy converter 208. The energy converter 208 is part of a system which converts energy from the vehicle propulsion battery 204 into energy useable by the at least one propulsion motor 206. In some instances, the energy flow is from the at least one propulsion motor 206 to the vehicle propulsion battery 204. As such, in some examples, the vehicle propulsion battery 204 transmits energy to the energy converter 208, which converts the energy into energy usable by the at least one propulsion motor 206 to propel the electric vehicle. In additional examples, the at least one propulsion motor 206 generates energy that is transmitted to the energy converter 208. In these examples, the energy converter 208 converts the energy into energy which can be stored in the vehicle propulsion battery 204. In some examples, the energy converter 208 includes transistors. Some examples include one or more field effect transistors. Some examples include metal oxide semiconductor field effect transistors. Some examples include one more insulated gate bipolar transistors. As such, in various examples, the energy converter 208 includes a switch bank which is configured to receive a direct current ("DC") power signal from the vehicle propulsion battery 204 and to output a three-phase alternating current ("AC") signal to power the vehicle propulsion motor 206. In some examples, the energy converter 208 is configured to convert a three phase signal from the vehicle propulsion motor 206 to DC power to be stored in the vehicle propulsion battery 204. Some examples of the energy converter 208 convert energy from the vehicle propulsion battery 204 into energy usable by electrical loads other than the vehicle propulsion motor 206. Some of these examples switch energy from approximately 390 Volts to 14 Volts.

The propulsion motor 206 is a three phase alternating current ("AC") propulsion motor, in various examples. Some examples include a plurality of such motors. The present subject matter can optionally include a transmission or gearbox 210 in some examples. While some examples include a 2-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 210 to wheels 212 via one or more axles 214, in various examples.

A vehicle management system 216 is optionally provided which provides control for one or more of the vehicle propulsion battery 204 and the energy converter 208. In some examples, the vehicle management system 216 is coupled to vehicle system which monitors a safety system (such as a crash sensor). In some examples the vehicle management system 216 is coupled to one or more driver inputs (e.g., an accelerator). The vehicle management system 216 is configured to control power to one or more of the vehicle propulsion battery 204 and the energy converter 208, in various embodiments.

External power 218 is provided to communicate energy with the vehicle propulsion battery 204, in various examples. In various embodiments, external power 218 includes a charging station that is coupled to a municipal power grid. In some examples, the charging station converts power from a 110V AC power source into power storable by the vehicle propulsion battery 204. In additional examples, the charging station converts power from a 220V AC power source into power storable by the vehicle propulsion battery 204. Voltages in the range of from about 208 volts to about 240 volts are contemplated. Some embodiments include converting energy from the battery 204 into power usable by a municipal grid. The present subject matter is not limited to examples in which a converter for converting energy from an external source to energy usable by the vehicle 200 is located outside the vehicle 200, and other examples are contemplated.

In various embodiments, the external power 218 is coupled to a charging coupler 220. This charging coupler 220 is matable to a charging coupler port 222, in various embodiments. In various embodiments, the charging coupler port 222 includes an illuminated indicator 224. The illuminated indicator includes a lamp disposed proximate to a body panel of the electrical vehicle 202 in some embodiments. The lamp includes an LED in some embodiment. In additional embodiments, other lamps are used. In some embodiments, the illuminated indicator lights the exterior of the vehicle 202 and the charging coupler port 222. In some embodiments, the illuminated indicator lights only the charging coupler port 222.

Some examples include a vehicle display system 226. The vehicle display system 226 include a visual indicator of system 200 information in some embodiments. The vehicle display system 226 includes the illuminated indicator in some embodiments. In some embodiments, the vehicle display system 226 includes a monitor that includes information related to system 200. Some embodiments include one or more lights. Some embodiments include one or more lights, and the vehicle display system 226 in these embodiments includes the illumination and brightness of these lights. The vehicle management system, in some embodiments, coordinates the function of a charge state circuit 106, and the charging coupler port 108, as pictured in FIG. 1. In certain instances, the charge state circuit 106, and the charging coupler port 108 are part of the vehicle management system 216. In some of these instances, the lighting circuit 114 is part of the vehicle display system 226. In some embodiments, the illuminated indicator 116 of FIG. 1 is part of the vehicle display system 226.

Figure 3:
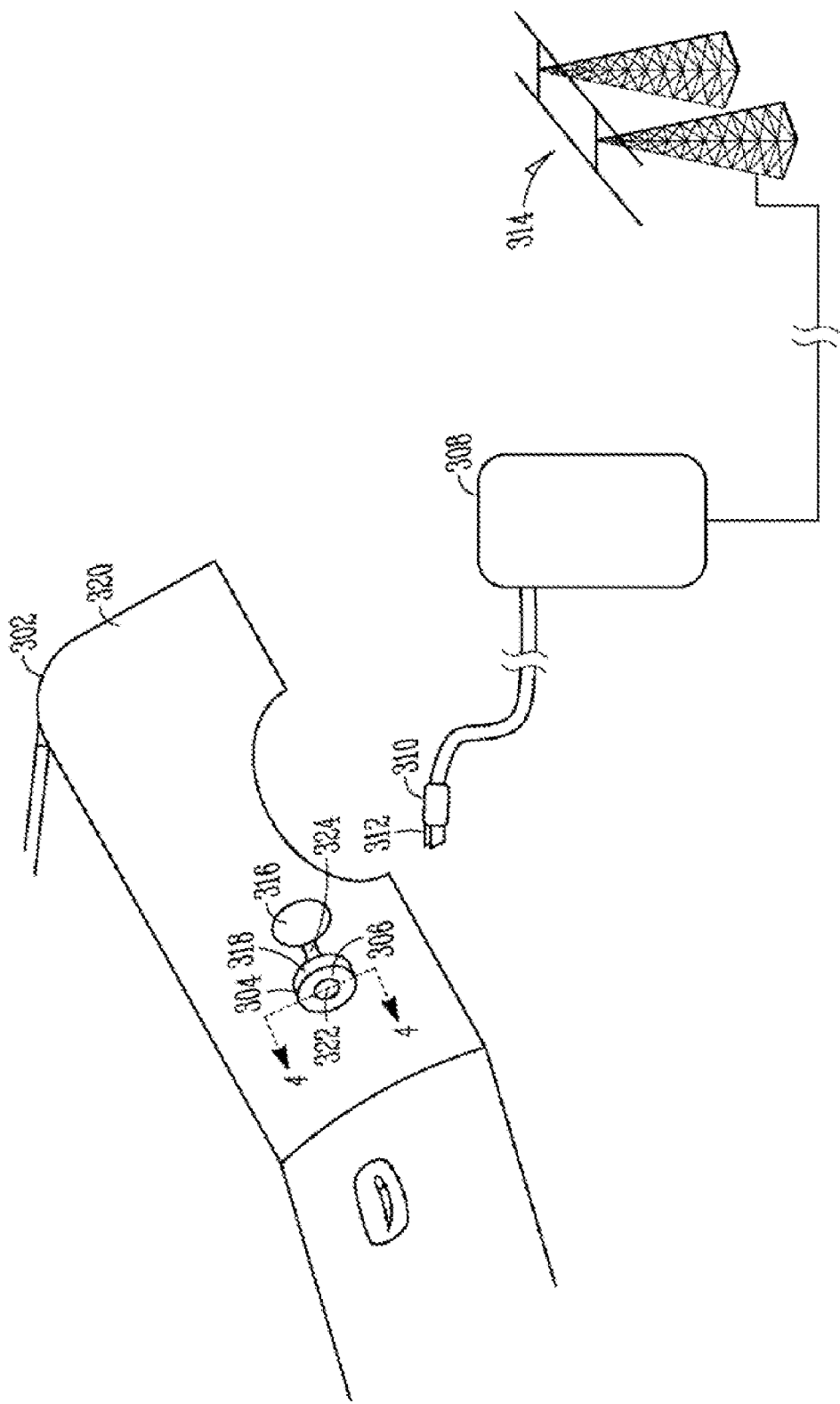
FIG. 3 illustrates a partial perspective view of a system including an electric vehicle, a charger, a charging coupler port, and other components, according to one embodiment.
Figure 4:
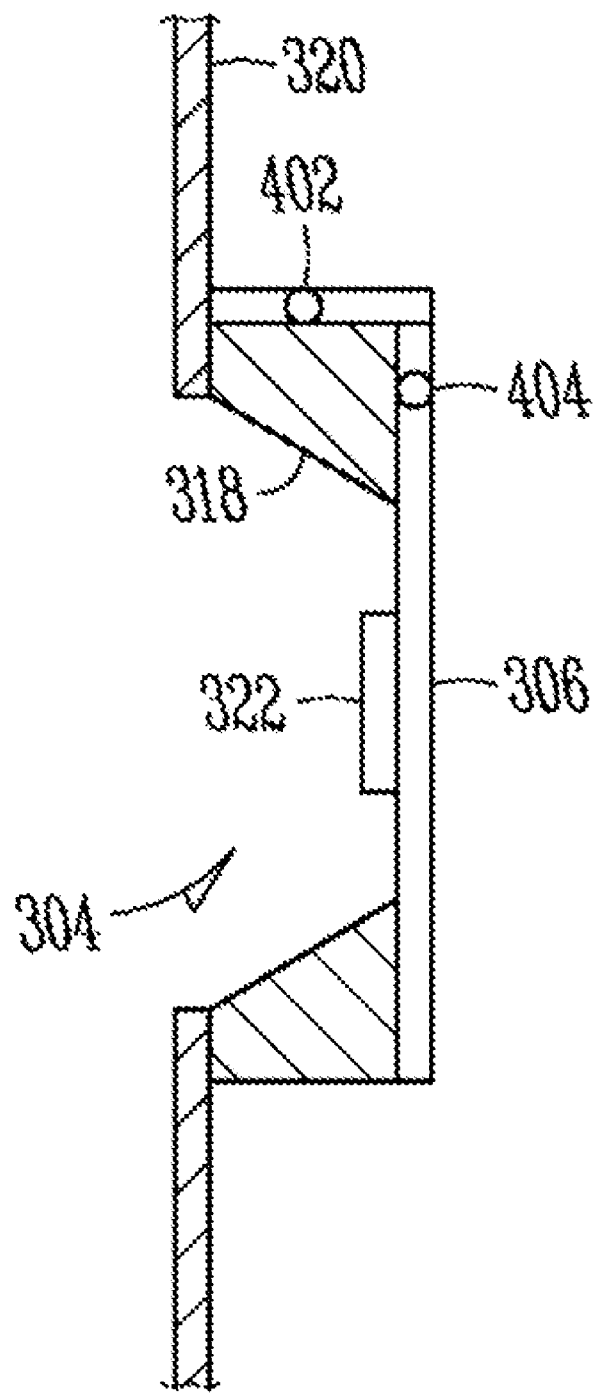
FIG. 4 illustrates a cross section along line 4-4 in FIG. 3.

FIG. 3 illustrates a partial perspective view of a system including an electric vehicle, a charger, a charging coupler port, and other components, according to one embodiment. FIG. 4 illustrates a cross section along line 4-4 in FIG. 3. An electric vehicle 302 is pictured. The electric vehicle 302 includes a charging coupler port recess 304. The charging coupler port recess 304 includes a charging coupler port 306 which is in electrical communication with a battery of the electrical vehicle 302. A charging station 308 includes a charging coupler 310 which includes a charging coupler terminal 312. Although blade terminals are shown for the charging coupler port 304 and the charging coupler 310, other terminals are contemplated, such as rod type, pin and socket type, pads, and other types. In some embodiments, the charging station 308 is coupled to a municipal power grid 314.

In various embodiments, a lens 318 is disposed between the body panel 320 and the charging coupler port 306. In various embodiments, the lens 318 and the charging coupler port 306 at least partially define the recess 304 in the electric vehicle 302. In various embodiments, an illuminated indicator is shielded from the recess 304 by the lens 318. FIG. 4 illustrates an embodiment in which a lens 318 shields a first illuminated indicator 402 and a second illuminated indicator 404 from the recess 304. The illuminated indicators in FIG. 4 can be mounted on printed circuit boards, or can couple to the electric vehicle 302 in other ways. Although two illuminated indicators are shown, embodiments in which a single illuminated indicator is used are possible, as are ones with more than two illuminated indicators. The lens 318 is shown tapering down from the body panel 320 to the charging coupler port 306, but the present subject matter is not so limited.

In some embodiments, the lens 318 is a diffuser. In some embodiments, the lens 318 is part of a lamp. The lens 318 can comprise a neon lamp, an LED lamp, an incandescent, or any other arc or non-arc light emitter, according to various embodiments. In some embodiments, the lens 318 includes an illuminated indicator light pipe. In some embodiments, the lens 318 casts light on the charging coupler port 306. In additional embodiments, the lens 318 casts light on the exterior body panel 320. Some embodiments include a lens 318 that casts light on both the charging coupler port 306 and the exterior body panel 320.

In an alternative embodiment, lamps that are used primarily for other purposes on the vehicle are used in place of, or in addition to, lens 318. In various embodiments, this includes, but is not limited to, directional lamps, headlamps, stop lamps, running lamps, interior lamps, and other lamps.

Embodiments are included in which the lens 318 is at least partially arcuate and encircles the charging coupler port along the exterior of the vehicle, as pictured in FIGS. 3-4. Additional configurations are contemplated, includes those in that the lens 318 is substantially rectangular and borders the charging coupler port. Other shapes are possible, and it is not necessary that the lens 318 encircle or otherwise circumscribe the charging coupler port 306. In some embodiments, a charging coupler port door 316 at least partially covers a charging coupler recess 304 which contains the charging coupler port 306. In some embodiments, the charging coupler port door 316 is coupled to the vehicle using a hinge 324. In some embodiments, a lighting circuit (e.g., the lighting circuit 114 illustrated in FIG. 1) is configured to operate the illuminated indicator and to deliver a white color if a charging coupler is not coupled to the charging coupler port 306 and the charging coupler port door is in an open state, as illustrated. In some instances, a switch is coupled to the charging coupler port door 316 and the lighting circuit to define a conductive path to the lighting circuit when the charging coupler port door 316 is open. In some instances, this lighting circuit monitors the conductive path and operates an illuminated indicator when the charging coupler port door 316 is in an open state. In various embodiments, this illuminates lens 318 so it casts visible light on at least the charge port coupler 306.

Figure 5:
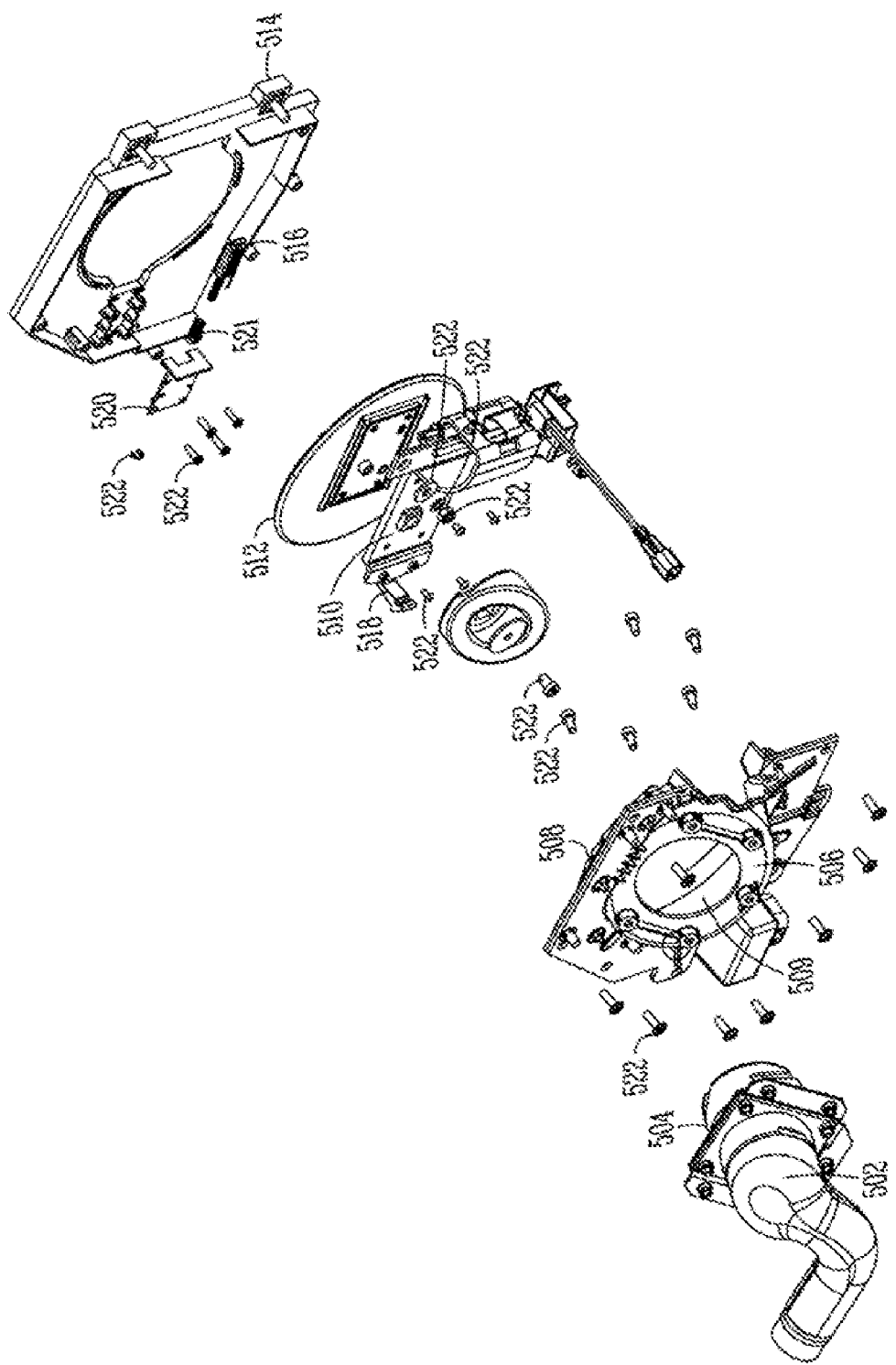
FIG. 5 illustrates a perspective view of a charging coupler port, according to one embodiment.

FIG. 5 illustrates a perspective view of a charging coupler port, according to one embodiment. The illustration is highly detailed, and other configurations that differ from that shown are possible depending on which embodiment is studied. The illustration shows a conductive path. The conductive path at least partially includes the wiring bundle (also known as a harness or loom) 502. The wiring bundle is part of the charging coupler port 504. A lens assembly 506 is illustrated that includes a light pipe 508 including a diffractive surface 509 and a plurality of LEDs disposed between a printed circuit board and the light pipe 508. A hinge 510 is shown.

A charging coupler port door 512 is shown. This is coupled to the hinge 510. This door is to cover a recess in that the charging coupler port 504 is disposed. A fixture 514 is shown that is used to assist in coupling the charging coupler port 502, the lens assembly 506, and the hinge 510 to an electric vehicle. A lock 516 is shown that can be used to lock a first lock portion 518 to a mating lock portion 520 such that the hinge 510 is restricted from motion. A spring 521 is shown that allows the first lock portion 518 to snap into a mating relationship with mating lock portion 520. The power of the spring can be overcome to open the charging coupler port door 512, in various embodiments. This can be useful for safety and security, as it is desirable to prevent others from tampering with the charging coupler port 504. A plurality of fasteners are collectively labeled 522 and are included for clarity, but can be reconfigured as needed in different embodiments.

Figure 6:
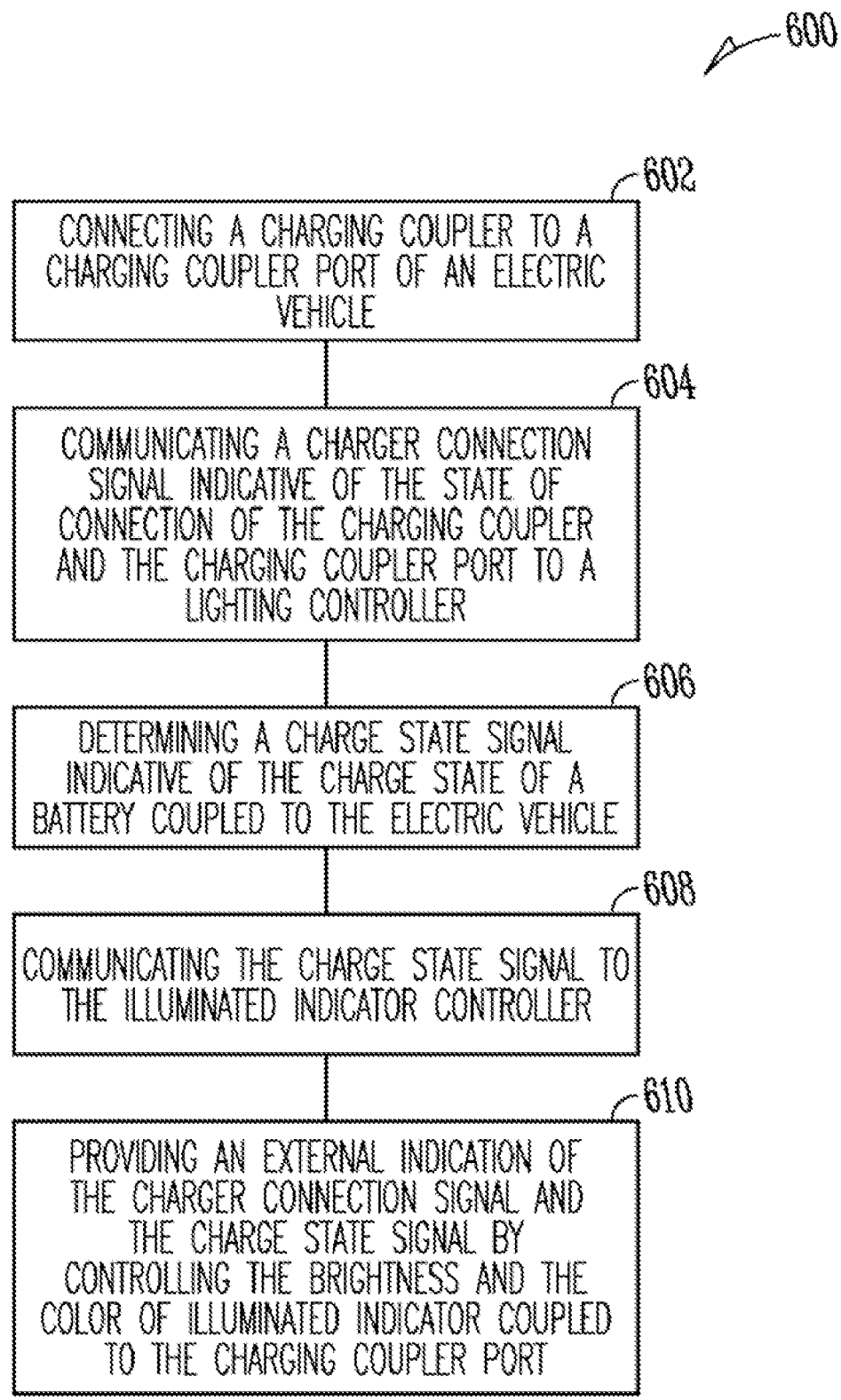
FIG. 6 illustrates a process for indicating charge, according to one embodiment.

FIG. 6 illustrates a method 600 for indicating charge, according to one embodiment. At 602, the method includes connecting a charging coupler to a charging coupler port of an electric vehicle. Various embodiments include opening a charging coupler port door which is hinged to the electric vehicle and which at least partially covers the charging coupler port prior to connecting the charging coupler to the charging coupler port of the electric vehicle. At 604, the method includes communicating a charger connection signal indicative of the state of connection of the charging coupler and the charging coupler port to a lighting controller. At 606, the method includes determining a charge state signal indicative of the charge state of a battery coupled to the electric vehicle. At 608, the method includes communicating the charge state signal to the illuminated indicator controller.

At 610, the method includes providing an external indication of the charger connection signal and the charge state signal by controlling the brightness and the color of illuminated indicator coupled to the charging coupler port. In optional embodiments, the method includes illuminating the charging coupler port with the at least one illuminated indicator while a charging coupler port door coupled to the vehicle and covering a recess in which the charging coupler port is located is open. In some embodiments, the method includes controlling the illuminated indicator to a blue color if the charging coupler is coupled to the charging coupler port and the charging coupler port is not transmitting charging energy. Some example embodiments include a method that includes determining a target charge state, comparing the charge state to the target charge state and controlling the illuminated indicator to a green color if the charge state exceeds the target charge state.

Certain embodiments include detecting a first electrical vehicle fault with a fault detection circuit and controlling the illuminated indicator to a red color if the first electrical vehicle fault is detected. Certain additional embodiments include flashing the illuminated indicator to a red color if the first electrical vehicle fault is detected. In some embodiments, a method includes detecting a second electrical vehicle fault with the fault detection circuit. Some of these embodiments include varying the illumination of the illuminated indicator over time responsive to the second fault signal. Various faults are contemplated. For example, if one of a plurality of batteries malfunctions, a fault can be indicated. In one embodiment, a vehicle performs a system check and if a fault is detected, and the illuminated indicator lights red when the charging coupler port door is opened. In some of these embodiments, the light is solid.

Various embodiments include a method that includes controlling the illuminated indicator to a yellow color if the charging coupler is coupled to the charging coupler port and the charging coupler port is transmitting charging energy. In some of these embodiments, the method includes pulsing the illuminated indicator when the charging coupler port is transmitting charging energy. In some of these embodiments, the method includes pulsing illuminated indicator at a first frequency when the charge state of the battery is at a first charge, and at a second frequency, which is less than the first frequency, when the charge state of the battery is at a second charge which is higher than the first charge. Optional embodiments include pulsing the illuminated indicator at a first frequency when the charge state of the vehicle propulsion battery is at a first charge, and at a second frequency, which is less than the first frequency, when the charge state of the vehicle propulsion battery is at a second charge which is higher than the first charge.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A battery charging monitoring and status indication system, comprising:
    a battery mounted to an electric vehicle;
    a charging coupler port mounted to said electric vehicle and coupled to said battery, the charging coupler port configured to conduct charging energy to said battery;
    a charging coupler port door, wherein said charging coupler port door at least partially covers said charging coupler port;
    a charging coupler port door switch configured to output a first door status signal when said charging coupler port door is open and to output a second door status signal when said charging coupler port door is closed;
    a battery charge state circuit,
        wherein said battery charge state circuit is configured to output a first charge state signal when a charging coupler is attached to said charging coupler port and energy is not being transmitted through said charging coupler port,
        wherein said battery charge state circuit is configured to output a second charge state signal when said charging coupler is attached to said charging coupler port and when energy is being transmitted through said charging coupler port and when a battery state of charge (SOC) is less than a target SOC, and
        wherein said battery charge state circuit is configured to output a third charge state signal when said charging coupler is attached to said charging coupler port and when said battery SOC is greater than said target SOC;
    a fault detection circuit configured to output a fault signal when an electrical fault is detected; and
    a lighting circuit,
        wherein said lighting circuit is configured to activate a first colored status indicator when said charging coupler port door switch outputs said first door status signal and when said battery charge state circuit does not output said first, second or third charge state signals,
        wherein said lighting circuit is configured to activate a second colored status indicator when said charging coupler port door switch outputs said first door status signal and said battery charge state circuit outputs said first charge state signal,
        wherein said lighting circuit is configured to activate a third colored status indicator when said charging coupler port door switch outputs said first door status signal and said battery charge state circuit outputs said second charge state signal,
        wherein said lighting circuit is configured to activate a fourth colored status indicator when said charging coupler door switch output said first door status signal and said battery charge state circuit outputs said third charge state signal, and
        wherein said lighting circuit is configured to activate a fifth colored status indicator when said charging coupler door switch output said first door status signal and said fault detection circuit outputs said fault signal.

2. The battery charging monitoring and status indication system of claim 1, wherein said first, second, third, fourth and fifth colored status indicators are comprised of LEDs.

3. The battery charging monitoring and status indication system of claim 1, further comprising a lens at least partially surrounding said charging coupler port to direct light from said first, second, third, fourth and fifth colored status indicators onto said charging coupler port.

4. The battery charging monitoring and status indication system of claim 3, said lens further comprising a diffuser.

5. The battery charging monitoring and status indication system of claim 3, said lens further comprising a light pipe disposed between a body panel of said electrical vehicle and said charging coupler port, wherein said light pipe is configured to transmit light from said first, second, third, fourth and fifth colored status indicators to said body panel.

6. The battery charging monitoring and status indication system of claim 5, wherein said first, second, third, fourth and fifth colored status indicators are comprised of LEDs configured to illuminate an input surface of said light pipe.

7. The battery charging monitoring and status indication system of claim 1, further comprising a hinge, wherein said hinge couples said charging coupler port door to said electric vehicle.

8. The battery charging monitoring and status indication system of claim 1, further comprising a light pipe, wherein said light pipe is at least partially arcuate and at least partially surrounds said charging coupler port to direct light from said first, second, third, fourth and fifth colored status indicators onto said charging coupler port.

9. The battery charging monitoring and status indication system of claim 1, wherein said first colored status indicator emits white light, wherein said second colored status indicator emits blue light, wherein said third colored status indicator emits yellow light, wherein said fourth colored status indicator emits green light, and wherein said fifth colored status indicator emits red light.

10. The battery charging monitoring and status indication system of claim 1, wherein said lighting circuit is configured to pulse said third colored status indicator when said charging coupler port door switch outputs said first door status signal and said battery charge state circuit outputs said second charge state signal.

11. The battery charging monitoring and status indication system of claim 10, wherein said lighting circuit is configured to pulse said third colored status indicator at a first frequency when said battery SOC is less than said target SOC and less than a first charge level, and wherein said lighting circuit is configured to pulse said third colored status indicator at a second frequency when said battery SOC is less than said target SOC and greater than said first charge level.

12. The battery charging monitoring and status indication system of claim 1, wherein said electrical fault is indicative of a battery malfunction.

13. The battery charging monitoring and status indication system of claim 1, wherein said battery is comprised of a plurality of cells.

14. The battery charging monitoring and status indication system of claim 1, wherein said battery is comprised of a plurality of lithium ion cells.

* * * * *